United States Patent [19]

Potter et al.

[11] Patent Number: 5,532,947
[45] Date of Patent: Jul. 2, 1996

[54] COMBINED DECODER/ADDER CIRCUIT WHICH PROVIDES IMPROVED ACCESS SPEED TO A CACHE

[75] Inventors: Terence M. Potter; John S. Muhich, both of Austin, Tex.

[73] Assignee: International Business Machines Corporation, Armonk, N.Y.

[21] Appl. No.: 377,820

[22] Filed: Jan. 25, 1995

[51] Int. Cl.$^6$ .............................. G06F 7/00; G06F 7/50; G11C 8/00
[52] U.S. Cl. .............. 364/715.01; 364/786; 365/230.06; 395/375
[58] Field of Search ..................... 364/715.01, 746, 364/784, 786, 787; 365/230.02, 230.06

[56] References Cited

U.S. PATENT DOCUMENTS

| | | | |
|---|---|---|---|
| H1291 | 2/1994 | Hinton et al. | |
| 4,763,302 | 8/1988 | Yamada | 365/189.01 |
| 4,811,208 | 3/1989 | Myers et al. | 364/200 |
| 5,041,968 | 8/1991 | Yamaguchi | 364/200 |
| 5,101,341 | 3/1992 | Circello et al. | 395/375 |
| 5,148,480 | 9/1992 | Forsyth | 380/28 |
| 5,222,244 | 6/1993 | Carbine et al. | 395/800 |
| 5,233,553 | 8/1993 | Shak et al. | 364/746 |
| 5,453,927 | 9/1995 | Matsuo | 395/375 |
| 5,467,318 | 11/1995 | Motomura | 365/230.06 |

OTHER PUBLICATIONS

IBM Technical Disclosure Bulletin, vol. 23, No. 5, Oct., 1980 pp. 1770–1779.
IBM Technical Disclosure Bulletin, vol. 27, No. 1B, Jun., 1984 pp. 915–920.
IBM Technical Disclosure Bulletin, vol. 33, No. 3B, Aug., 1990 pp. 187–188.

*Primary Examiner*—Roy N. Envall, Jr.
*Assistant Examiner*—Chuong D. Ngo
*Attorney, Agent, or Firm*—Benman Collins & Sawyer

[57] ABSTRACT

The present invention is directed toward an combined decoder/adder circuit which provides faster access to a cache in a microprocessor than implementations which include an adder circuit which is followed by a decoder circuit. By decoding the upper order bits of a first operand and then rotating the upper order bits of the first operand by the upper order bits of a second operand, followed by an additional shift by one which is enabled by a carry generator the overall speed of the critical path is greatly increased. Accordingly, the time needed for generating an effective address (EA) and therefore accessing the cache is significantly decreased. The present invention has significant utility in microprocessors in which the word line decode is the critical path.

10 Claims, 4 Drawing Sheets

COMBINED DECODER/ADDER CIRCUIT WHICH PROVIDES IMPROVED ACCESS SPEED TO A CACHE

FIELD OF THE INVENTION

The present invention relates to a logic circuits utilized in a microprocessor and more particularly to circuits utilized for the accessing a data cache within in such microprocessors.

BACKGROUND OF THE INVENTION

A typical critical path in microprocessor designs is through the logic which generates the effective address (EA) for a load instruction (an adder) and then decodes that address to access the data cache (word line decoder). For load instructions and store instructions it is very important to "speed up" the processing of such instructions because they can take up to 40–50 percent of the instructions encountered in the execution of typical code by a microprocessor. In order to access a cache, an effective address (EA) is generated and must be followed by a word-line decoder to provide the output.

Accordingly, it is very important to speed up the access of the cache. As is well known, this is generally important to ensure that the instruction per cycle is optimized for each device. The latency associated with the critical path is also of paramount importance to the performance of the processor because load instructions are common and their latency determines when dependent instructions can start executing (i.e., the path cannot be split into multiple cycles without incurring a performance penalty).

Accordingly, what is needed is an improved logic circuit for providing a faster generation of the EA. The system should be simple and cost effective. In addition the system should be easily implemented in existing processor designs. The present invention addresses such a need.

SUMMARY OF THE INVENTION

A combined decoder/adder for operating on a first operand and a second operand is provided. The combined decoder/adder includes a decoder means for decoding upper order bits of the first operand and first shift means for receiving the decoded upper order bits of the first operand the upper order bits of the second operand and for rotating the decoded upper order bits of the first operand to an appropriate value based upon the upper bits of the second operand. The combined decoder/adder also includes a second shift means for receiving the appropriate value from the first shift means and a carry generator means for receiving the lower order bits of the first and second operand and providing an enable signal to the second shifter means when a carry is to be provided dependent upon state of the lower order bits of the first and second operand.

Through the combined decoder/adder of the present invention, the time needed for generating an effective address (EA) and therefore accessing the cache is significantly decreased.

DESCRIPTION OF THE INVENTION

The present invention relates to an improvement in a processor The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
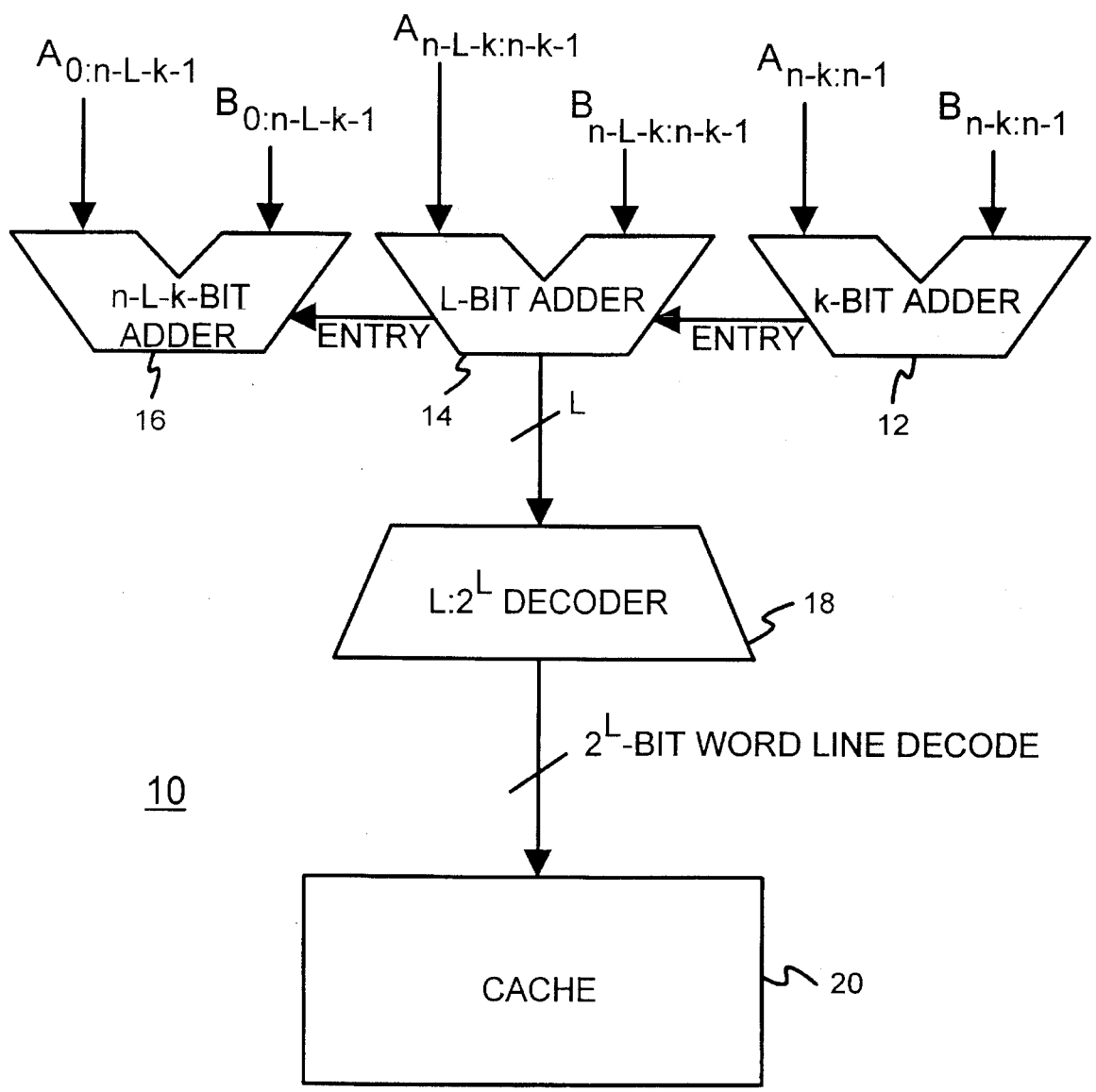
FIG. 1 is a block diagram of a general embodiment of a conventional adder/decoder utilized in a microprocessor.

FIG. 1 is a block diagram of a prior art adder/decoder 10. In this block diagram as is seen, there are three adders 12, 14 and 16. The adder 12 supplies the least significant bits, adder 14 is of middle significant bits and adder 16 provides the most significant bits. Each of adders have operand a and b which provide the effective address (EA) to the decoder 18. The decoder 18 decodes the signal to provide the bit wordline. The decoded bit wordline signal is then provided to the cache 20 for accessing the appropriate bits in the cache.

Figure 2:
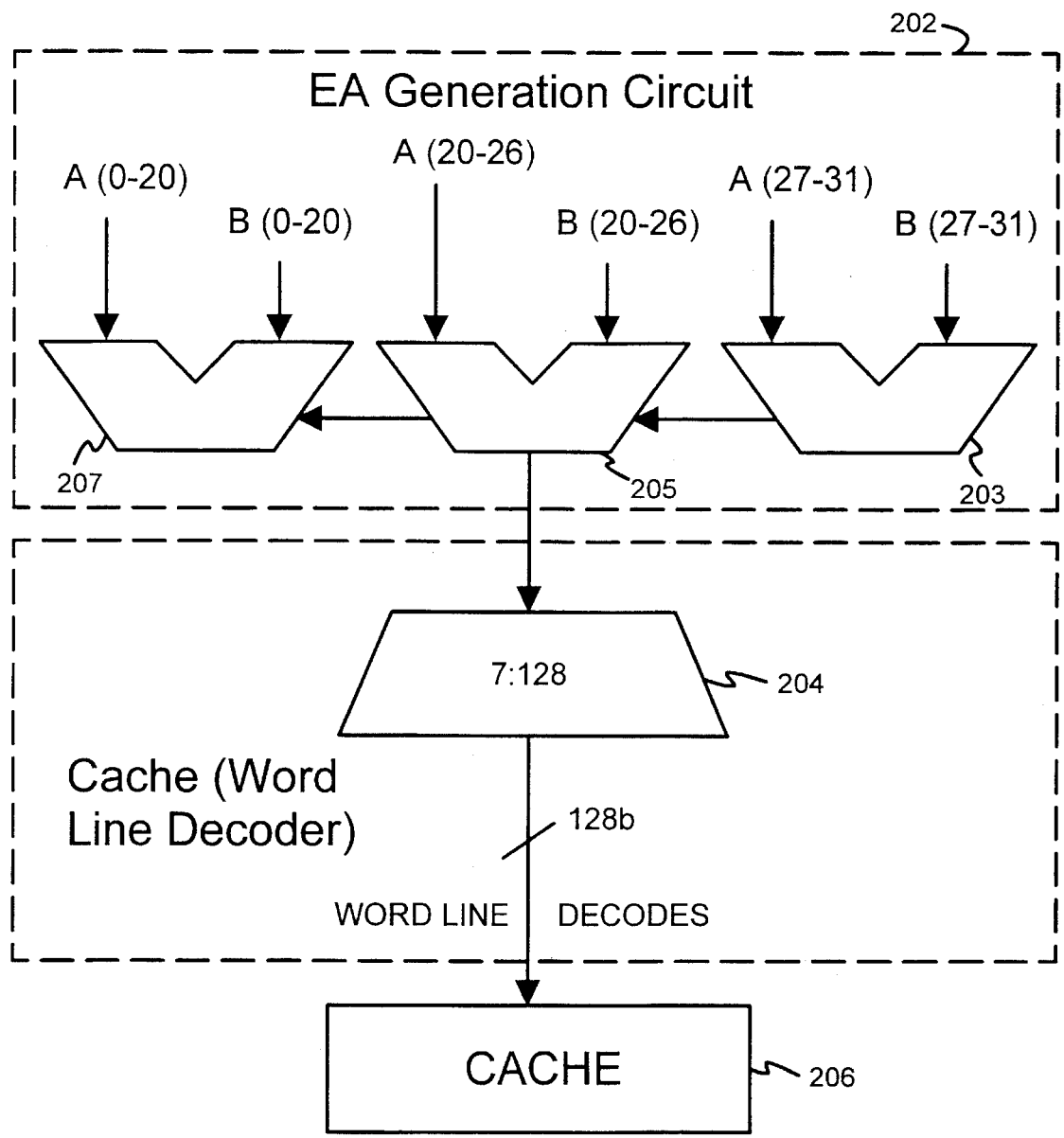
FIG. 2 is a diagram of a conventional 128 bit adder and decoder in accordance with the prior art.

To more particularly show how this critical path becomes a problem refer now to FIG. 2, which comprises a 12 bit adder/decoder 200. The adder/decoder of this embodiment comprises an 12 bit adder circuit 202 followed by a 7 to 128 wordline decode circuit 204. The adder circuit 202, in this embodiment, comprises three adders 203, 205 and 207.

As has been before described, it is very important to speed up critical paths of microprocessors and the like to improve the performance thereof. It is particularly important in microprocessor designs to provide logic circuits which will provide for faster access to the cache associated with such designs to substantially decrease the access time thereto.

In this embodiment the critical path is the signal provided from the decoder 204 to the cache 206. In this embodiment the cache 206 is a 4 kilobyte (KB) and has 32 byte line size. This standard approach for generating an EA and accessing the cache 206 is to perform the 12 bit add, followed by in this embodiment, a 7:128 wordline decode circuit which is fed by the upper order bits of the add result.

The critical path (assuming a standard carry-lookahead adder) is generating the upper-order bit of the sum which is then used in the decoder 64 times. As has been before mentioned, it is important to decrease the amount of time required to access the cache of a microprocessor. The critical feature is the size of the decode. Hence, for example, if 10 lines of cache are to be decoded the critical path becomes slower. Therefore, as the number of wordlines that are to be accessed increase there is a corresponding substantial increase in the access time to the cache.

Figure 3:
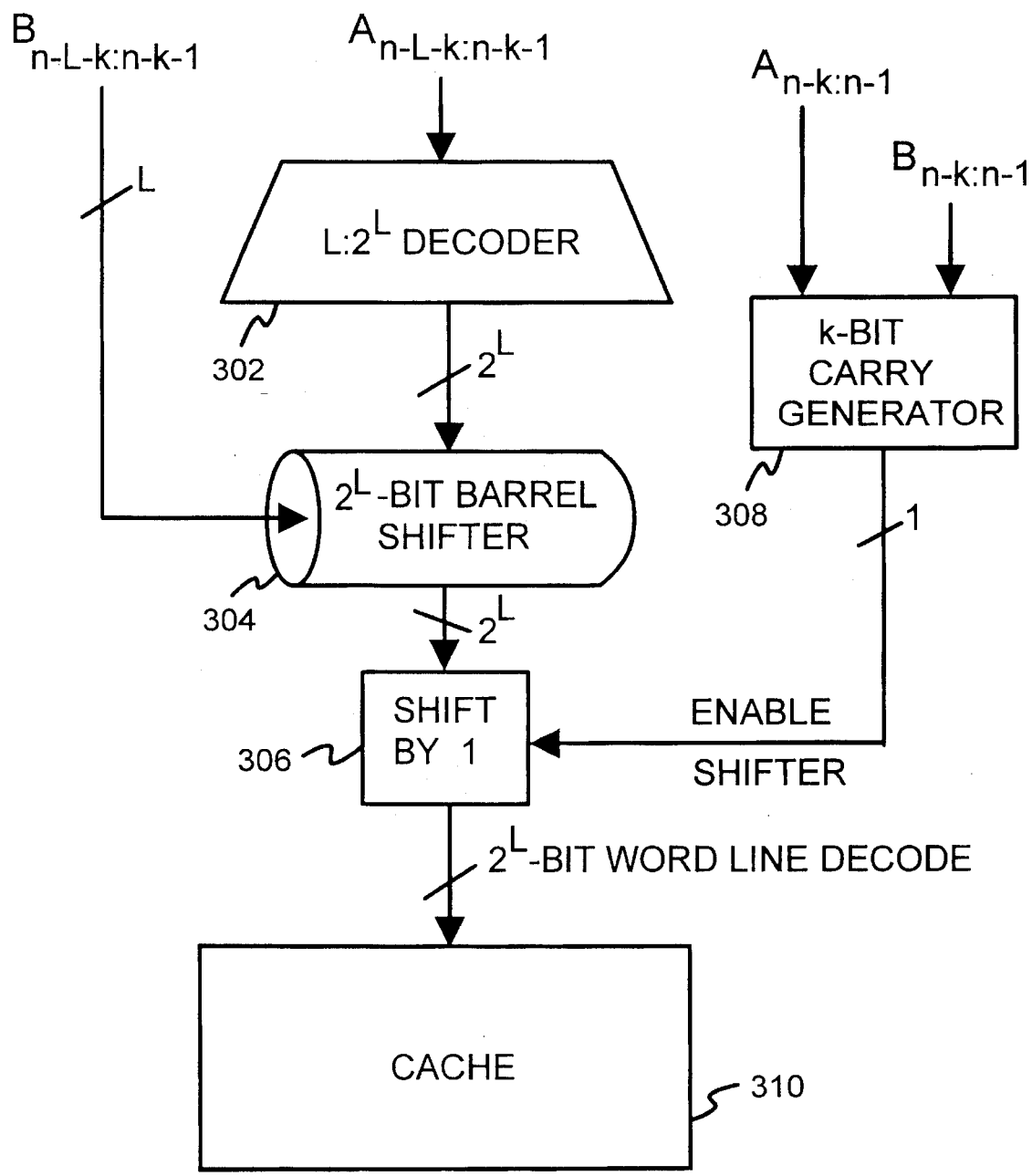
FIG. 3 is a block diagram of a combined decoder/adder in accordance with the present invention.

The present invention is directed toward a logic circuit which increases the speed of this critical path and therefore decreases the access time to the cache. To more particularly describe the operation of a circuit in accordance with the present invention, refer now to FIG. 3 which is a block diagram of a combined decoder/adder circuit 300 in accordance with the present invention.

The circuit 300 includes a $2^N$ decoder 302 for receiving the A operand of the higher order bits. The decoder 302 is coupled to $2^L$ bit barrel shifter 304. The $2^L$ bit barrel shifter 304 also receives B operand of the higher order bits. The barrel shifter is coupled to a shift by one shifter 306. A K-bit carry generator 308 is coupled to the shifter 306 to appropriately enable the shifter 306. The shifter 306 provides the $2^L$ bit word line decode to the cache 310.

To more particularly describe the operation of the combined decoder/adder 300 of the present invention refer now to the following. In this embodiment the bits from A operand are decoded in decoder 302 before the add takes place. Thereafter the corresponding bits from the B operand are utilized to rotate the A operand value to the appropriate position via barrel shifter 304.

The result from the barrel shifter 304 is provided to the shift by one shifter 306. The shift by one shifter 306 will shift the result from the barrel shifter 304 dependent upon whether the enable signal from carry bit generator 308 is generated. The carry bit generator 308 is enabled by the A operand and B operand from the low order bits of the A operand and B operand. Accordingly, a decoder/adder circuit in accordance with the present invention combines the functions into a single unit that outputs the word line select signals to the cache.

Figure 4:
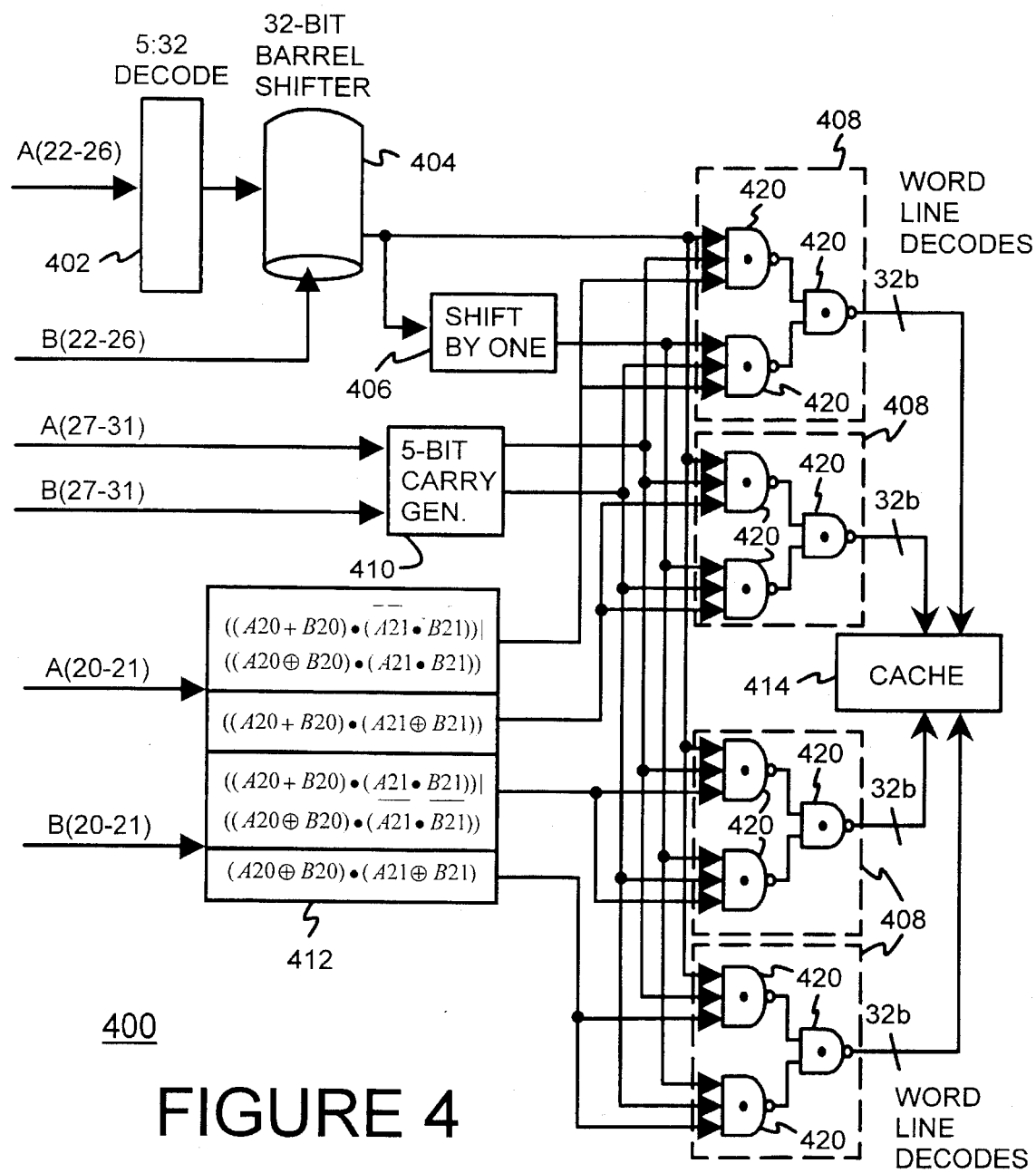
FIG. 4 is an embodiment of a 128 bit combined adder/decoder in accordance with the present invention.

To more particularly describe the advantages of the decoder/adder circuit 300 in accordance with present invention, refer now to FIG. 4 which is one embodiment of a 12 bit combined decoder/adder 400 in accordance with the present invention. One of ordinary skill in the art recognizes the combined decoder/adder in accordance with the present invention can be any size and their use would be within the spirit and scope of the present invention. The primary reason that the embodiment, shown in FIG. 4, is a 12 bit combined decoder/adder circuit 400 is to afford a direct comparison of the combined decoder/adder 400 shown in FIG. 4 with the 12 bit conventional adder and decoder 200 shown in FIG. 2.

The combined decoder/adder 400 includes a decoder 402 which decodes 5 bits of the A operand (bits 22–26). The decoder 402 provides those decoded bits to 32 bit barrel shifter 404. The barrel shifter 404 also receives 5 bits of the B operand (bits 22–26). The barrel shifter 404 is coupled to a shift by one shifter 406 and a plurality of 2 to 1 multiplexers 408. Each of the 2 to 1 multiplexers 408 comprise a plurality of NAND gates 420 (in this embodiment three). Upper order bits of the A and B operand in this case bits 27–31 are provided to a 5 bit carry generator 410. The logic block 412 utilizes the upper two order bits (20 and 21) of the A and B operand to select the appropriate 2 to 1 multiplexer 408.

In order to add decoded signals a right shift (e.g., if the A operand is 12 (bit 12 is on) and the B operand is 3 (bit 3 is on) then to add, the barrel shifter 404 right shifts 12 by 3, leaving bit 15 on—15 is the sum). This provides a decoded sum. The five low order bits are decoded which will be used to access the cache 414 for operand A (bits 22–26). These low order bits are then right shifted by the same five bits of operand B by 32 bit barrel shifter 404. This provides the five low order bits of the sum in a decoded form—but not including a possible carry in from the lower order bits of the operand. A 5 bit carry generation circuit 410 is utilized to generate the carry out of the low order bits. The carry is used to select between the decoded sum and the decoded sum shifted by one. The decoded sum is then provided in this embodiment in modulo 32.

In order to generate the 128 word line decode, this 32 bit sum is repeated four times and one of the 2 to 1 multiplexers 408 of 32 bits is enabled based on a decode of the two upper order bits of the A and B operand. The critical path through the combined decoder/adder 400 is through the 5 bit carry generation circuit 410. The 5 bit carry generation circuit 410 generates carry and carry signals, each of which has 128 loads on it (double the number of loads on the critical result bit in the add-then-decode implementation).

After the appropriate buffering, these signals are used to select the 2 to 1 multiplexer 408 represented by logic block 408 with an enable from decoder 412 (the decodes from the upper order bits form the four enable lines). Accordingly it is seen that the 5 bit carry generator is faster than the 12 bit adder shown in FIG. 2. Also, the extra buffering stage and the 2 to 1 multiplexer 408 is faster than the 7:128 decoder in the conventional circuit shown in FIG. 2.

As is seen by the above description, a combined decoder/adder circuit in accordance with the present invention has significant speed advantage over conventional add and decode circuits. Accordingly a combined decoder/adder circuit is provided which can be as much as 30 percent faster than implementations which use a separate add followed by a decoder circuit. This circuit decreases the time needed for generating an EA and accessing a cache line, an important critical path in many microprocessors.

Although the present invention has been described in accordance with the embodiments shown, one of ordinary skill in the art will readily recognize that there could be variations to the embodiments and those variations would be within the spirit and scope of the present invention.

Accordingly many elements could be utilized to perform the functions described in the prepared embodiments. For example, although barrel shifter has been described as the device for rotating the decoded output, it should be readily understood that a variety of devices could be utilized to perform this function and their use would be within the spirit and scope of the present invention.

Similarly, the shift by one shifter could be implemented by a variety of devices and their use would be within the spirit and scope of the present invention. Finally, the carry generator could be implemented by a variety of devices and their use would also be within the spirit and scope of the present invention. Accordingly, many modifications may be made by one of ordinary skill in the art without departing from the spirit and scope of the appended claims.

What is claimed is:

1. A combined decoder/adder for operating on a first operand and a second operand, each of the first and second operands being represented by a plurality of bits comprising:

decoder means for decoding upper order bits of the first operand;

first shift means for receiving the decoded upper order bits of the first operand and the upper order bits of the second operand and for rotating the decoded upper order bits of the first operand to an appropriate value based upon the upper bits of the second operand;

a second shifter means for receiving the appropriate value from the first shifter means;

a generator means for receiving the lower order bits of the first and second operand and providing an enable signal to the second shifter means when a carry is to be provided dependent upon state of the lower order bits of the first and second operand.

2. The combined decoder/adder of claim 1 in which the first shifter means comprises a barrel shifter.

3. The combined decoder/adder of claim 1 in the second shifter means comprises a shift by one shifter.

4. The combined decoder/adder of claim 1 in which the generator means comprises a carry bit generator.

5. The combined decoder/adder of claim 1 in which the first operand comprises an A operand.

6. The combined decoder/adder of claim 5 in which the second operand comprises a B operand.

7. A method for providing access to data within a cache, the method comprising the steps of:

(a) decoding a first plurality of upper order bits of a first operand;

(b) receiving the decoded first plurality of upper order bits of the first operand and a second plurality of upper order bits of a second operand;

(c) rotating the decoded first plurality of upper order bits to an appropriate value based upon the second plurality of upper order bits of the second operand;

(d) receiving a third and fourth plurality lower order bits from the first and second operand; and (e) shifting the appropriate value by one dependent upon the state of the third and fourth plurality of bits.

8. The combined decoder/adder of claim 1 in which the first operand comprises an A operand.

9. The combined decoder/adder of claim 5 in which the second operand comprises a B operand.

10. A combined decoder/adder for operating on an A operand and a B operand, each of the A and B operands being represented by a plurality of bits comprising:

decoder means for decoding upper order bits of the A operand;

barrel shifter for receiving the decoded upper order bits of the A operand and the upper order bits of the B operand and for rotating the decoded upper order bits of the A operand to an appropriate value based upon the upper bits of the B operand;

a shift by one shifter for receiving the appropriate value from the barrel shifter;

a carry bit generator for receiving the lower order bits of the A and B operand and providing an enable signal to the shift by one shifter when a carry is to be provided dependent upon state of the lower order bits of the A and B operand.

\* \* \* \* \*